UNITED STATES PATENT OFFICE.

HEINZ EVERS, OF ZURICH, SWITZERLAND, ASSIGNOR TO GERSTER & CIE., OF CLARENS-MONTREUX, SWITZERLAND.

METHOD OF ELIMINATING THE ACTIVE TOXIC AGENT FROM COFFEE.

978,866.      Specification of Letters Patent.     Patented Dec. 20, 1910.

No Drawing.      Application filed September 7, 1909. Serial No. 516,561.

*To all whom it may concern:*

Be it known that I, HEINZ EVERS, a citizen of Switzerland, residing at Zurich, Switzerland, have invented certain new and useful Improvements in Methods of Eliminating the Active Toxic Agent from Coffee, of which the following is a specification.

The present invention relates to a method of treating coffee beans in such a manner that an infusion made from the treated coffee beans will produce no toxic action on the human system.

It is the primary object of my invention to provide a method of physically or mechanically treating the beans, as contradistinguished from a chemical treatment thereof, whereby the treated coffee beans retain all their aroma and when made into an infusion produce no toxic action on the system of the consumer.

In practicing my invention I preferably subject the coffee beans firstly to the combined action of heat and vacuum, secondly to the action of superheated steam and thirdly again to heat and vacuum. By the first step of the process, *i. e.* the combined action of heat and vacuum the cellular walls of the coffee beans are caused to burst or open enabling the heat to penetrate into the innermost recesses of the beans and act on the substances therein which produce the toxic effect on the human system when the coffee infusion is drunk by the consumer, these substances being thus volatilized and converted into proper condition for extraction or removal from the bean. The object of the second step in the process, viz. the introduction of superheated steam, is to cause the intense heat which resides in the steam to quickly and incisively penetrate the previously opened beans, the steam thus becoming saturated with the freed toxic substances and being in an ideal condition to carry off the same. By the third step of the process, the second evacuation, the steam charged with the toxic substances quickly escapes carrying with it the hot deleterious substances and leaving behind the coffee beans freed from active toxic agents but retaining all their original aroma.

It is preferable to carry out the steps of the process in the order above named although it is within the scope of my invention to subject the beans first to the action of steam and thereafter to the action of a vacuum. It will also be understood that, if desired, the several steps of the process may be repeated should the particular kind of coffee beans being treated require such treatment.

I obtain the best results by employing a double walled receiver into which the coffee beans are introduced and maintaining the same at a temperature of approximately 160° C. The steam pressure is preferably at 5 to 6 atmospheres and the rarefaction produced by the vacuum preferably corresponds to about 720 mm. of mercury column.

Having thus described my invention what I claim as new and desire to secure by Letters Patent is:—

1. The herein described method of eliminating those substances from coffee beans which form the active toxic agents when the beans are made into an infusion, which method consists in subjecting said coffee beans to the combined action of heat and vacuum whereby the cellular walls of the beans are caused to burst and the toxic substances therein are liberated by the heat, thereafter subjecting said beans to the action of superheated steam whereby the steam absorbs the liberated toxic substances, and finally again subjecting the beans to the action of heat and vacuum whereby the steam is caused to carry off in a hot condition the toxic substances with which it is charged.

2. The herein described method of eliminating those substances from coffee beans which form the active toxic agents when the beans are made into an infusion, which method consists in introducing said coffee beans into a closed vessel continuously heated to approximately 160° C., and producing a vacuum in said vessel corresponding to approximately 720 mm. mercury column whereby the cellular walls of said coffee beans are opened and the toxic substances are liberated therefrom, introducing steam at a pressure of approximately 6 atmospheres into said vessel whereby the steam will become saturated with the toxic substances, and finally again producing a vacuum of approximately 720 mm. mercury column in said vessel whereby the steam charged with the toxic substances will quickly pass from the vessel.

In testimony whereof I affix my signature in presence of two witnesses.

HEINZ EVERS.

Witnesses:
ADOLF BÜRDEKE,
ALBERT SUESS.